United States Patent
Kim

(10) Patent No.: US 10,909,912 B2
(45) Date of Patent: Feb. 2, 2021

(54) DISPLAY SYSTEM AND METHOD OF SYNCHRONIZING A FRAME DRIVING TIMING FOR THE SAME

(71) Applicant: Samsung Display Co., Ltd., Yongin-si (KR)

(72) Inventor: Woo-Chul Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 55 days.

(21) Appl. No.: 16/289,550

(22) Filed: Feb. 28, 2019

(65) Prior Publication Data
US 2019/0340973 A1 Nov. 7, 2019

(30) Foreign Application Priority Data

May 4, 2018 (KR) .................. 10-2018-0052159

(51) Int. Cl.
*G09G 3/3208* (2016.01)
*G09G 5/12* (2006.01)
*G06F 1/10* (2006.01)

(52) U.S. Cl.
CPC .............. *G09G 3/3208* (2013.01); *G06F 1/10* (2013.01); *G09G 5/12* (2013.01); *G09G 2310/0264* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS

| | | | | |
|---|---|---|---|---|
| 9,870,731 | B2* | 1/2018 | Jiang .................... | G09G 3/3208 |
| 2005/0094030 | A1* | 5/2005 | Brelay .................... | H04N 7/01 |
| | | | | 348/441 |
| 2006/0251252 | A1* | 11/2006 | Quan .................... | H04N 5/913 |
| | | | | 380/204 |
| 2007/0053655 | A1* | 3/2007 | Fujiwara ............ | G11B 20/1403 |
| | | | | 386/344 |
| 2007/0085575 | A1* | 4/2007 | Cooper .............. | H04N 21/4307 |
| | | | | 327/108 |

(Continued)

FOREIGN PATENT DOCUMENTS

KR 10-2018-0129019 A 12/2018

*Primary Examiner* — William Lu
(74) *Attorney, Agent, or Firm* — Lewis Roca Rothgerber Christie LLP

(57) ABSTRACT

A display system includes a source device that outputs image-data and a sink device that performs a displaying operation based on the image-data. The sink device changes a frame-rate of a panel driving frame as the source device changes a frame-rate of an image frame. The sink device sets a first clock cycle starting point at which a first clock cycle of an emission on-off clock starts as a scan starting point of the panel driving frame when the first clock cycle starting point is consistent with an input starting point of image frame data. The sink device moves the input starting point to a second clock cycle starting point, at which a second clock cycle following the first clock cycle starts, and sets the second clock cycle starting point as the scan starting point when the first clock cycle starting point is inconsistent with the input starting point.

18 Claims, 9 Drawing Sheets

(56) References Cited

U.S. PATENT DOCUMENTS

| | | | | |
|---|---|---|---|---|
| 2009/0161809 A1* | 6/2009 | Xiu | ............................ | H03L 7/18 |
| | | | | 375/376 |
| 2009/0243995 A1* | 10/2009 | Kimura | ................ | G09G 3/3648 |
| | | | | 345/102 |
| 2012/0033042 A1* | 2/2012 | Mori | .................... | H04N 7/0127 |
| | | | | 348/43 |
| 2012/0257071 A1* | 10/2012 | Prentice | ............. | H04N 5/23238 |
| | | | | 348/220.1 |
| 2012/0272089 A1* | 10/2012 | Hatfield | .............. | G06F 13/4291 |
| | | | | 713/501 |
| 2014/0132646 A1* | 5/2014 | Aoki | .................... | G09G 3/3233 |
| | | | | 345/691 |
| 2016/0196802 A1* | 7/2016 | Nho | ......................... | G09G 3/20 |
| | | | | 345/212 |
| 2018/0151109 A1* | 5/2018 | Shim | .................... | G09G 3/3233 |

* cited by examiner

DISPLAY SYSTEM AND METHOD OF SYNCHRONIZING A FRAME DRIVING TIMING FOR THE SAME

CROSS-REFERENCE TO RELATED APPLICATION

This application claims priority to, and the benefit of, Korean Patent Application No. 10-2018-0052159, filed on May 4, 2018 in the Korean Intellectual Property Office (KIPO), the contents of which are incorporated herein in their entirety by reference.

BACKGROUND

1. Field

Embodiments relate generally to a display system. More particularly, embodiments of the present inventive concept relate to a display system including a display device that employs an impulse driving method by which a light emitting element included in a pixel circuit emits light in response to an emission on-off clock, and a to a method of synchronizing a frame driving timing for the display system.

2. Description of the Related Art

Generally, a display system includes a source device and a sink device. Here, the source device (e.g., a graphic processing unit (GPU)) transmits image data to the sink device (e.g., an organic light emitting display device), and the sink device performs a displaying operation based on the image data transmitted from the source device.

Recently, a display system may change a frame rate of an image frame composing the image data (or may change duration (or time) of the image frame) in real-time according to characteristics of images to be displayed while the displaying operation is performed. For example, when the images to be displayed change relatively quickly, the source device may increase the frame rate of the image frame to be transmitted to the sink device (e.g., may decrease the duration of the image frame).

On the other hand, when a change of the images to be displayed is relatively slow, the source device may decrease the frame rate of the image frame to be transmitted to the sink device (e.g., may increase the duration of the image frame). Here, if a frame rate of a panel driving frame for the displaying operation (or a length of time of the panel driving frame) is not changed, the frame rate of the image frame may be inconsistent with the frame rate of the panel driving frame, so that a driving timing of the image frame may be inconsistent with a driving timing of the panel driving frame. Thus, a phenomenon such as an image tearing, an image stuttering, etc. may occur in the images that the sink device displays due to inconsistency between the driving timing of the image frame and the driving timing of the panel driving frame.

For this reason, a synchronization technique may synchronize the driving timing of the panel driving frame with the driving timing of the image frame by changing the frame rate of the panel driving frame as the frame rate of the image frame is changed. However, when a related synchronization technique is applied to a display system including a display device that employs an impulse driving method, in which a light emitting element (e.g., an organic light emitting diode) included in a pixel circuit emits light in response to an emission on-off clock, the emission on-off clock may be distorted in each panel driving frame as the driving timing of the panel driving frame is synchronized with the driving timing of the image frame. As a result, the related synchronization technique may cause a flicker that a user (or viewer) can perceive when the display device employing the impulse driving method displays the image corresponding to the image frame.

SUMMARY

Some embodiments provide a display system, which includes a source device and a sink device, that can prevent a perceptible flicker from occurring by synchronizing a driving timing of a panel driving frame with a driving timing of an image frame without distortion of an emission on-off clock when the sink device (e.g., a display device employing an impulse driving method by which a light emitting element included in a pixel circuit emits light in response to the emission on-off clock) changes a frame rate of the panel driving frame as the source device (e.g., a graphic processing unit) changes a frame rate of the image frame.

Some embodiments provide a method of synchronizing a frame driving timing for the display system.

According to embodiments, a display system may include a source device configured to output image data, and a sink device configured to perform a displaying operation based on the image data, the sink device including a pixel circuit that includes a light emitting element for emitting light in response to an emission on-off clock in a panel driving frame for the displaying operation, wherein the source device is configured to change a frame rate of an image frame composing the image data while the displaying operation is performed, wherein the sink device is configured to change a frame rate of the panel driving frame as the frame rate of the image frame is changed, seta first clock cycle starting point, at which a first clock cycle of the emission on-off clock starts, as a scan starting point of the panel driving frame when the first clock cycle starting point is consistent with an input starting point of image frame data corresponding to the image frame, and delay the input starting point of the image frame data by a first time to move the input starting point of the image frame data to a second clock cycle starting point, at which a second clock cycle following the first clock cycle starts, and set the second clock cycle starting point as the scan starting point of the panel driving frame when the first clock cycle starting point is inconsistent with the input starting point of the image frame data.

The source device may include a graphic processing unit, wherein the sink device includes an organic light emitting display device, and wherein the light emitting element includes an organic light emitting diode.

The light emitting element may emit light in an on-period of the emission on-off clock, might not emit light in an off-period of the emission on-off clock, and may emit light only a number of times in each panel driving frame.

The first clock cycle starting point and the second clock cycle starting point may be falling edges at which the emission on-off clock is changed from the on-period to the off-period.

The on-period and the off-period of the emission on-off clock might not be changed when the frame rate of the image frame and the frame rate of the panel driving frame are changed.

The sink device may include a buffer memory device having more than a capacity corresponding to the first time, the buffer memory device being configured to temporarily store a portion of the image frame data corresponding to the first time, and to then output the portion of the image frame data.

The first time may be shorter than a time corresponding to one clock cycle of the emission on-off clock.

The sink device may be configured to increase the frame rate of the panel driving frame as the source device increases the frame rate of the image frame.

The sink device may be configured to decrease the frame rate of the panel driving frame as the source device decreases the frame rate of the image frame.

The frame rate of the panel driving frame may be changed while an emission duty ratio of the panel driving frame is not changed.

The frame rate of the panel driving frame may be changed while satisfying $$F = \frac{1}{A \times K},$$

where F denotes the frame rate of the panel driving frame, A denotes a time corresponding to one clock cycle of the emission on-off clock, and K is an integer that is greater than or equal to 1.

The source device may be configured to change the frame rate of the image frame according to characteristics of images to be displayed by the displaying operation.

The source device may be configured to increase the frame rate of the image frame when the images change faster than a reference speed.

The source device may be configured to decrease the frame rate of the image frame when the images change slower than a reference speed.

According to embodiments, a method of synchronizing a frame driving timing, where a frame rate of a panel driving frame is changed as a frame rate of an image frame composing image data is changed while a display operation is performed, may include checking whether an input starting point of image frame data corresponding to the image frame is consistent with a first clock cycle starting point at which a first clock cycle of an emission on-off clock starts, wherein a light emitting element of a pixel circuit is configured to emit light in response to the emission on-off clock, determining the first clock cycle starting point as the input starting point of the image frame data and a scan starting point of the panel driving frame when the input starting point of the image frame data is consistent with the first clock cycle starting point, and determining a second clock cycle starting point, at which a second clock cycle following the first clock cycle starts, as the input starting point of the image frame data and the scan starting point of the panel driving frame when the input starting point of the image frame data is inconsistent with the first clock cycle starting point.

The light emitting element may be configured to emit light in an on-period of the emission on-off clock, to not emit light in an off-period of the emission on-off clock, and to emit light only a number of times in each panel driving frame.

The first clock cycle starting point and the second clock cycle starting point may be falling edges at which the emission on-off clock is changed from the on-period to the off-period.

The on-period and the off-period of the emission on-off clock might not be changed when the frame rate of the image frame and the frame rate of the panel driving frame are changed.

The method may further include changing the frame rate of the panel driving frame while an emission duty ratio of the panel driving frame is not changed.

The method may further include changing the frame rate of the panel driving frame while satisfying $$F = \frac{1}{A \times K},$$

where F denotes the frame rate of the panel driving frame, A denotes a time corresponding to one clock cycle of the emission on-off clock, and K is an integer that is greater than or equal to 1.

Therefore, a display system, and a method of synchronizing a frame driving timing for the display system, according to disclosed embodiments may include a source device (e.g., a graphic processing unit) and a sink device (e.g., a display device employing an impulse driving method by which a light emitting element included in a pixel circuit emits light in response to an emission on-off clock), where the sink device changes a frame rate of a panel driving frame as the source device changes a frame rate of an image frame.

Here, the display system, and the method of synchronizing the frame driving timing for the display system, may synchronize a driving timing of the panel driving frame with a driving timing of the image frame without distortion of the emission on-off clock. This may be accomplished by setting a first clock cycle starting point at which a first clock cycle of the emission on-off clock starts as a scan starting point of the panel driving frame when the first clock cycle starting point is consistent with an input starting point of image frame data corresponding to the image frame, and by delaying the input starting point of the image frame data by a specific time, which is shorter than a time corresponding to one clock cycle of the emission on-off clock, to move the input starting point of the image frame data to a second clock cycle starting point at which a second clock cycle of the emission on-off clock following the first clock cycle starts, and by setting the second clock cycle starting point as the scan starting point of the panel driving frame when the first clock cycle starting point is inconsistent with the input starting point of the image frame data. As a result, the display system and the method of synchronizing the frame driving timing for the display system may prevent a flicker that is otherwise perceivable by a user when an image corresponding to the image frame is displayed.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
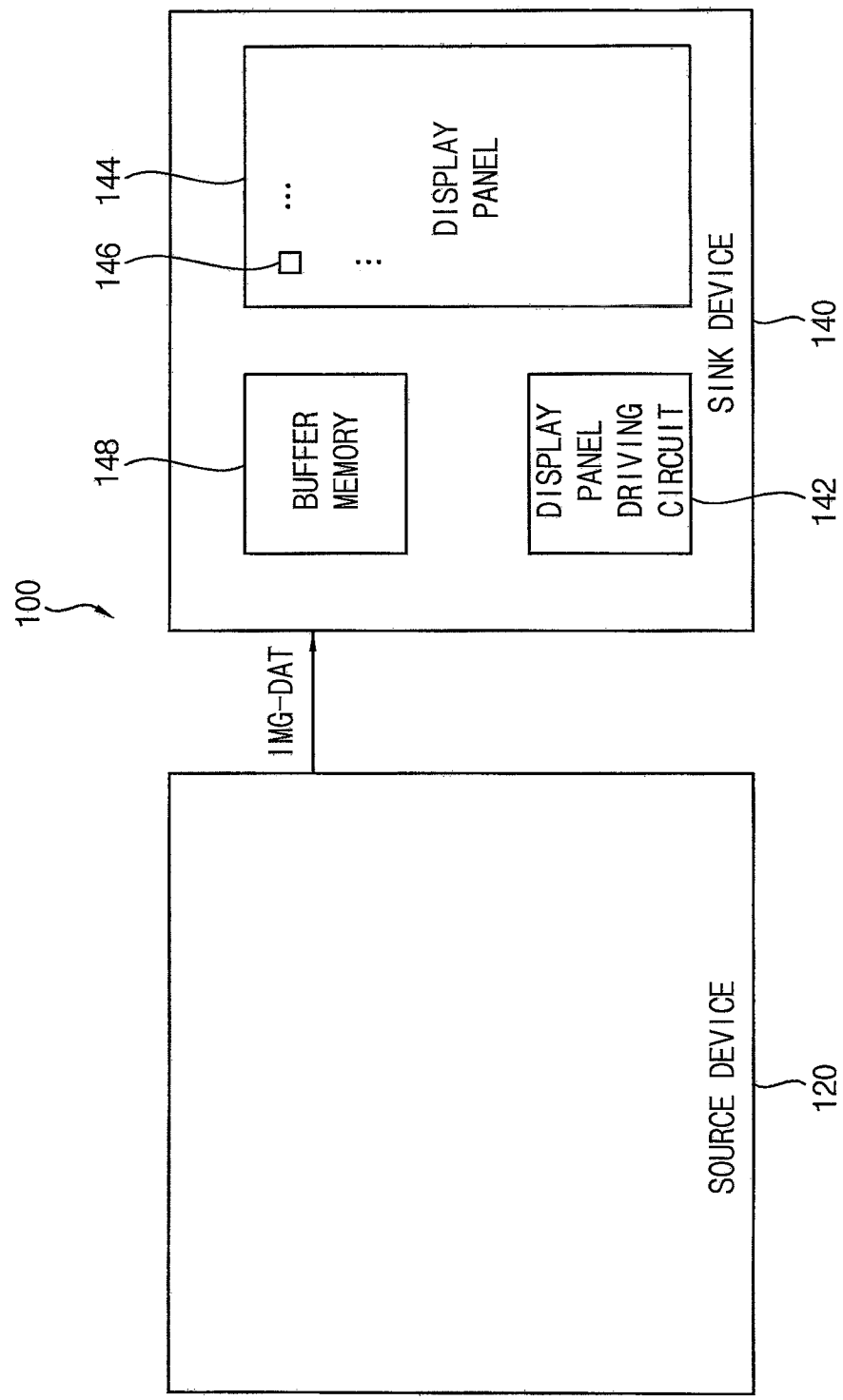
FIG. 1 is a block diagram illustrating a display system according to embodiments.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present invention.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
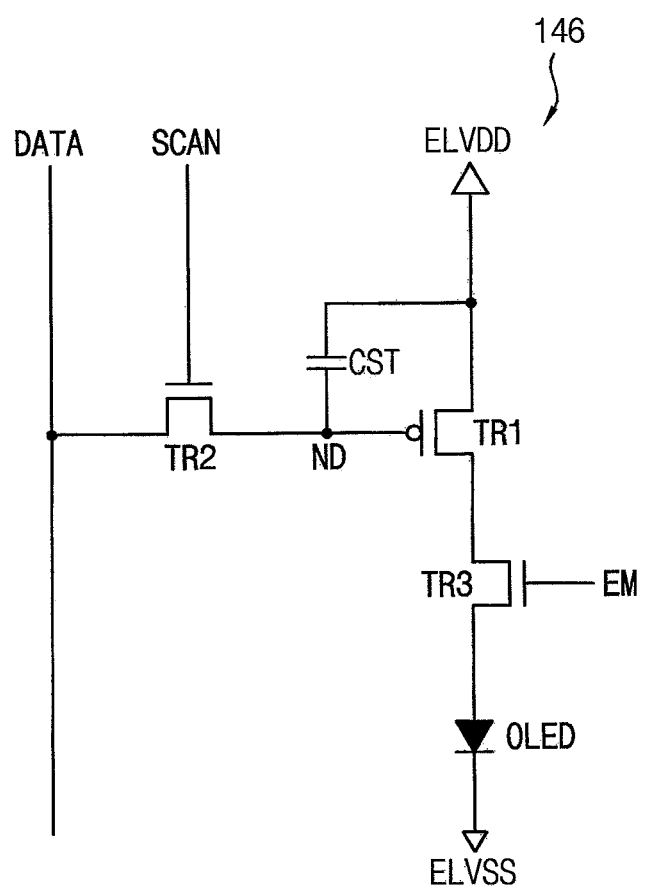
FIG. 2 is a circuit diagram illustrating an example of a pixel circuit included in a sink device included in the display system of FIG. 1.
Figure 3:
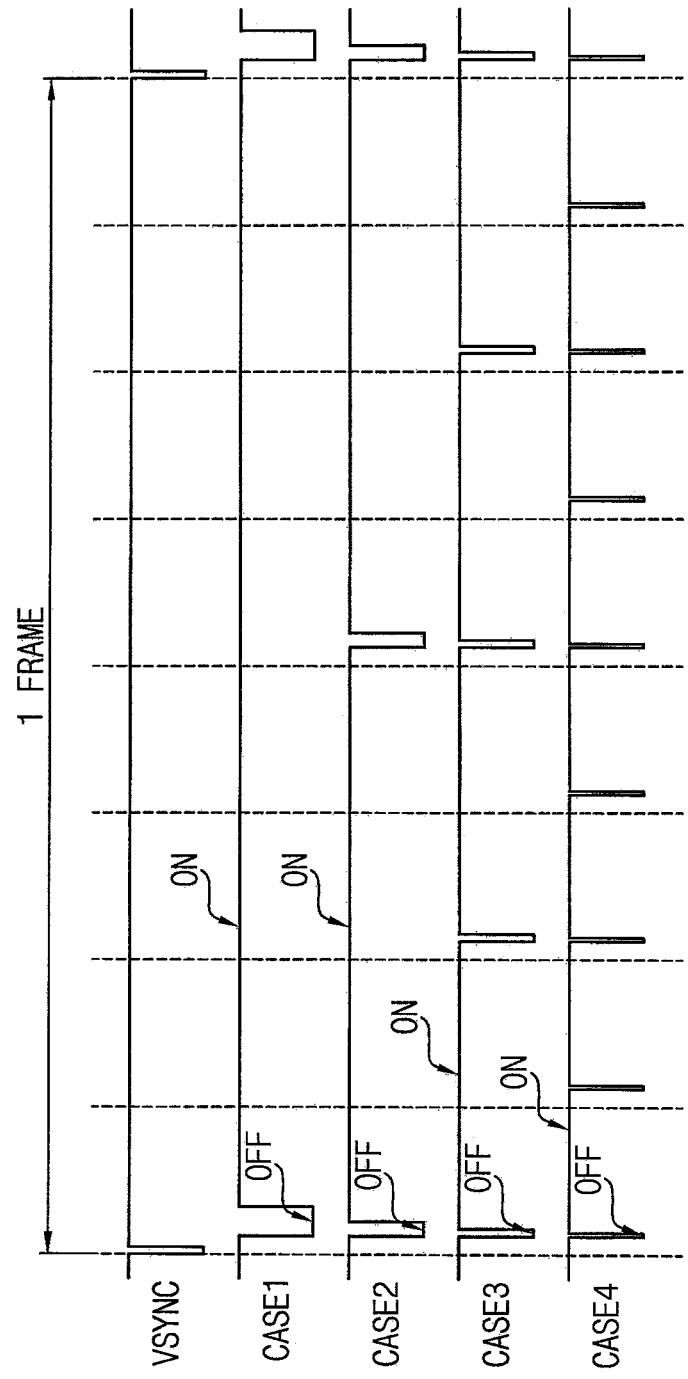
FIG. 3 is a timing diagram for describing that a sink device included in the display system of FIG. 1 is driven by an impulse driving method.

FIG. 1 is a block diagram illustrating a display system according to embodiments, FIG. 2 is a circuit diagram illustrating an example of a pixel circuit included in a sink device included in the display system of FIG. 1, and FIG. 3 is a timing diagram for describing that a sink device included in the display system of FIG. 1 is driven by an impulse driving method.

Referring to FIGS. 1 to 3, the display system 100 may include a source device 120 and a sink device 140. Here, the source device 120 and the sink device 140 may perform data communication using a given interface. For example, the source device 120 may transmit image data IMG-DAT to the sink device 140 using an embedded display port (eDP) interface. However, an interface between the source device 120 and the sink device 140 is not limited thereto.

The source device 120 may output the image data IMG-DAT. Here, the image data IMG-DAT may include a plurality of image frames (e.g., image frame data). In an embodiment, the source device 120 may be a graphic processing unit (GPU). The graphic processing unit may generate the image data IMG-DAT (e.g., rendering) to provide the image data IMG-DAT to the sink device 140. Here, the source device 120 may change a frame rate of an image frame composing the image data IMG-DAT in real-time according to characteristics of images to be displayed while a displaying operation is performed.

The sink device 140 may receive the image data IMG-DAT from the source device 120, and may perform the displaying operation based on the image data IMG-DAT. In addition, the sink device 140 may change a frame rate of a panel driving frame as the frame rate of the image frame is changed. For example, the sink device 140 may increase the frame rate of the panel driving frame as the source device 120 increases the frame rate of the image frame. On the other hand, the sink device 140 may decrease the frame rate of the panel driving frame as the source device 120 decreases the frame rate of the image frame.

As illustrated in FIG. 1, the sink device 140 may include a display panel driving circuit 142, and a display panel 144 that is driven by the display panel driving circuit 142. The display panel 144 may include a plurality of pixel circuits 146. Here, each of the pixel circuits 146 may include a light emitting element OLED that emits light in response to an emission on-off clock EM in a panel driving frame for the displaying operation. In an embodiment, the light emitting element may be an organic light emitting diode OLED, and the sink device 140 may be an organic light emitting display device.

For example, as illustrated in FIG. 2, the pixel circuit 146 may include a driving transistor TR1, a switching transistor TR2, an emission control transistor TR3, a storage capacitor CST, and the organic light emitting diode OLED. The driving transistor TR1 may be connected between a high power voltage ELVDD and the emission control transistor TR3. The switching transistor TR2 may be connected between a data line and a driving node ND. The emission control transistor TR3 may be connected between the driving transistor TR1 and the organic light emitting diode OLED. The storage capacitor CST may be connected between the high power voltage ELVDD and the driving node ND. The organic light emitting diode OLED may be connected between the emission control transistor TR3 and a low power voltage ELVSS. A data voltage DATA may be stored in the storage capacitor CST when the switching transistor TR2 is turned on in response to a scan signal SCAN. A current that is determined (or adjusted) by the driving transistor TR1 based on the data voltage DATA stored in the storage capacitor CST may flow through the organic light emitting diode OLED when the emission control transistor TR3 is turned on in response to the emission on-off clock EM. Thus, the pixel circuit 146 (e.g., the organic light emitting diode OLED) may emit light based on the current. However, because the above structure of the pixel circuit 146 is an example, the pixel circuit 146 included in the sink device 140 (e.g., the organic light emitting display device) is not limited thereto.

The display panel driving circuit 142 may receive the image data IMG-DAT output from the source device 120, and may display the images on the display panel 144 based on the image data IMG-DAT. The display panel driving circuit 142 may include a scan driver that provides the scan signal SCAN to the display panel 144, a data driver that provides a data signal (e.g., the data voltage DATA) to the display panel 144, a timing controller that controls the scan driver and the data driver, etc. However, components included in the display panel driving circuit 142 are not limited thereto.

As illustrated in FIG. 3, the sink device 140 may employ an impulse driving method by which the light emitting element OLED included in the pixel circuit 146 emits light in response to the emission on-off clock EM in a panel driving frame. For convenience of description, it is assumed in FIG. 3 that the panel driving frame is defined like the image frame by a vertical synchronization signal VSYNC, that a driving timing of the image frame is synchronized with a driving timing of the panel driving frame (e.g., an input starting point of image frame data corresponding to the image frame is consistent with a scan starting point of the panel driving frame, and the input starting point of the image frame data and the scan starting point of the panel driving frame are consistent with a clock cycle starting point at which a clock cycle of the emission on-off clock EM starts).

It is also assumed in FIG. 3 that the pixel circuit 146 emits light in all on-periods ON of the emission on-off clock EM belonging to the panel driving frame.

For example, the sink device 140 may control the pixel circuit 146 to emit light one or more times in response to the emission on-off clock EM in one panel driving frame (indicated by 1FRAME in FIG. 3). The emission on-off clock EM may include consecutive clock cycles, and each of the clock cycles may include the off-period OFF and the on-period ON. Thus, a clock cycle starting point at which one clock cycle of the emission on-off clock EM starts may be a falling edge at which a period of the emission on-off clock EM is changed from the on-period ON to the off-period OFF. Here, the pixel circuit 146 may emit light in the on-period ON of the emission on-off clock EM because the emission control transistor EM of the pixel circuit 146 is turned on in the on-period ON.

On the other hand, the pixel circuit 146 might not emit light in the off-period OFF of the emission on-off clock EM because the emission control transistor EM of the pixel circuit 146 is turned off in the off-period OFF. Thus, from a first case CASE1 to a fourth case CASE4, the number of times the pixel circuit 146 emits light in one panel driving frame (e.g., in 1FRAME) may increase because the number of the on-periods ON of the emission on-off clock EM belonging to the panel driving frame 1FRAME increases.

For example, the pixel circuit 146 may emit light one time in the first case CASE1, the pixel circuit 146 may emit light two times in the second case CASE2, the pixel circuit 146 may emit light four times in the third case CASE3, and the pixel circuit 146 may emit light eight times in the fourth case CASE4. However, from the first case CASE1 to the fourth case CASE4, one emission duration time during which the pixel circuit 146 emits light in one panel driving frame 1FRAME may decrease because a length (e.g., length of time) of respective on-periods ON of the emission on-off clock EM belonging to the panel driving frame 1FRAME decreases. Nevertheless, because a total length (e.g., a sum of individual lengths) of the on-periods ON belonging to one panel driving frame is the same in all cases CASE1 through CASE4, luminance of the pixel circuit 146 may be the same in all cases CASE1 through CASE4 when the same data voltage DATA is applied to the pixel circuit 146.

For convenience of description, one panel driving frame is indicated by 1FRAME in FIG. 3. However, it should be understood that one panel driving frame is defined as a period from a clock cycle starting point, at which a clock cycle of the emission on-off clock EM starts, to another clock cycle starting point, at which another clock cycle of the emission on-off clock EM following the clock cycle starts. Additionally, in FIG. 3, a panel driving frame illustrated as the first case CASE1, a panel driving frame illustrated as the second case CASE2, a panel driving frame illustrated as the third case CASE3, and a panel driving frame illustrated as the fourth case CASE4 are illustrated with respect to one horizontal line of the display panel 144 included in the sink device 140. In other words, because each of the scan signal SCAN and the emission on-off clock EM is sequentially applied to horizontal lines (e.g., scan lines or emission control lines) of the display panel 144, it should be understood that one panel driving frame is sequentially shifted for each of the horizontal lines of the display panel 144. For example, when the display panel 144 includes N horizontal lines, where N is an integer greater than or equal to 2, N emission on-off clocks EM, which are sequentially shifted by a specific time while having the same shape, may exist for the N horizontal lines. That is, the emission on-off clock EM illustrated as each case (e.g., CASE1, CASE2, CASE3, and CASE4) in FIG. 3 is for one horizontal line.

As described above, the source device 120 may change the frame rate of the image frame composing the image data IMG-DAT according to characteristics of the images to be displayed while the displaying operation is performed. Here, if the sink device 140 does not change the frame rate of the panel driving frame although the source device 120 changes the frame rate of the image frame, the frame rate of the image frame may be inconsistent with the frame rate of the panel driving frame, so that a driving timing of the image frame may be inconsistent with a driving timing of the panel driving frame. Thus, a phenomenon such as an image tearing, an image stuttering, etc. may occur in the images that the sink device 140 displays due to inconsistency between the driving timing of the image frame and the driving timing of the panel driving frame. For this reason, the sink device 140 may change the frame rate of the panel driving frame as the frame rate of the image frame is changed, and may synchronize the driving timing of the panel driving frame with the driving timing of the image frame. Here, the light emitting element OLED included in the pixel circuit 146 of the sink device 140 may emit light in the on-period ON of the emission on-off clock EM, the light emitting element OLED included in the pixel circuit 146 of the sink device 140 may not emit light in the off-period OFF of the emission on-off clock EM, and the light emitting element OLED included in the pixel circuit 146 of the sink device 140 may emit light (e.g., only a predetermined number of times) in each panel driving frame. In embodiments, the number of times may be variously set according to requirements for the display system 100. The sink device 140 may not change the on-period ON and the off-period OFF of the emission on-off clock EM to maintain an emission duty ratio of each panel driving frame when the frame rate of the image frame and the frame rate of the panel driving frame are changed.

For example, the sink device 140 may delay an input starting point of the image frame data corresponding to the image frame by a first time to move the input starting point of the image frame data to a clock cycle starting point at which a clock cycle of the emission on-off clock EM starts, and may set the clock cycle starting point as a scan starting point of the panel driving frame, where the first time is shorter than a time corresponding to one clock cycle of the emission on-off clock EM. To this end, the sink device 140 may include a buffer memory device 148 having more than a capacity corresponding to the first time, and the buffer memory device 148 may temporarily store a portion of the image frame data corresponding to the first time, and then may output the portion of the image frame data. Here, a clock cycle starting point at which one clock cycle of the emission on-off clock EM starts may be a falling edge at which a period of the emission on-off clock EM is changed from the on-period ON to the off-period OFF. Thus, although the frame rate of the panel driving frame is changed as the frame rate of the image frame is changed, the time of the panel driving frame may become an integer multiple of a time corresponding to one clock cycle of the emission on-off clock EM. As a result, the emission on-off clock EM need not be distorted when the frame rate of the image frame is synchronized with the frame rate of the panel driving frame. That is, the emission duty ratio of the panel driving frame might not be changed when the frame rate of the image frame is synchronized with the frame rate of the panel driving frame. These operations will be described below in detail with reference to FIGS. 5 to 7.

In an embodiment, the source device 120 may change the frame rate of the image frame according to characteristics of the images to be displayed by the displaying operation. For example, the source device 120 may increase the frame rate of the image frame when a change of the images to be displayed by the displaying operation is relatively fast (e.g., faster than a predetermined reference speed), such as in a fast-moving video, etc. On the other hand, the source device 120 may decrease the frame rate of the image frame when a change of the images to be displayed by the displaying operation is relatively slow (e.g., slower than a predetermined reference speed), such as with a slow-moving video, a still image, etc.

Here, the source device 120 may freely change the frame rate of the image frame without considering the synchronization between the frame rate of the image frame and the frame rate of the panel driving frame. Because the frame rate (e.g., in hertz (Hz)) of the image frame is inversely proportional to the time (e.g., in seconds) of the image frame, the time, or duration, of the image frame may decrease as the frame rate of the image frame increases, and the time/duration of the image frame may increase as the frame rate of the image frame decreases. Because the frame rate of the panel driving frame is inversely proportional to the time of the panel driving frame, the time of the panel driving frame may decrease as the frame rate of the panel driving frame increases, and the time of the panel driving frame may increase as the frame rate of the panel driving frame decreases. As described above, because the on-period ON and the off-period OFF of the emission on-off clock EM are not changed, although the frame rate of the image frame and the frame rate of the panel driving frame are changed, a time corresponding to one clock cycle (including the on-period ON and the off-period OFF) of the emission on-off clock EM may be maintained constant regardless of the frame rate of the image frame and the frame rate of the panel driving frame.

In brief, the display system 100 may include the source device 120 (e.g., a graphic processing unit) and the sink device 140 (e.g., a display device employing an impulse driving method by which the light emitting element OLED included in the pixel circuit 146 emits light in response to the emission on-off clock EM), where the sink device 140 changes the frame rate of the panel driving frame as the source device 120 changes the frame rate of the image frame. Here, the display system 100 may synchronize the driving timing of the panel driving frame with the driving timing of the image frame without distortion of the emission on-off clock EM by setting a first clock cycle starting point at which a first clock cycle of the emission on-off clock EM starts as the scan starting point of the panel driving frame when the first clock cycle starting point is consistent with an input starting point of the image frame data corresponding to the image frame, and by delaying the input starting point of the image frame data (e.g., by a specific amount of time, which may be shorter than a time corresponding to one clock cycle of the emission on-off clock EM) to move the input starting point of the image frame data to a second clock cycle starting point at which a second clock cycle of the emission on-off clock EM following the first clock cycle starts, and by setting the second clock cycle starting point as the scan starting point of the panel driving frame when the first clock cycle starting point is inconsistent with the input starting point of the image frame data. As a result, the display system 100 may prevent a flicker that may be perceived by a user when an image corresponding to the image frame is displayed, so that the display system 100 may provide a high-quality image to the user. Although it is illustrated in FIG. 1 that the sink device 140 includes the display panel driving circuit 142, the display panel 144, and the buffer memory device 148, the sink device 140 may further include additional components.

Figure 4:
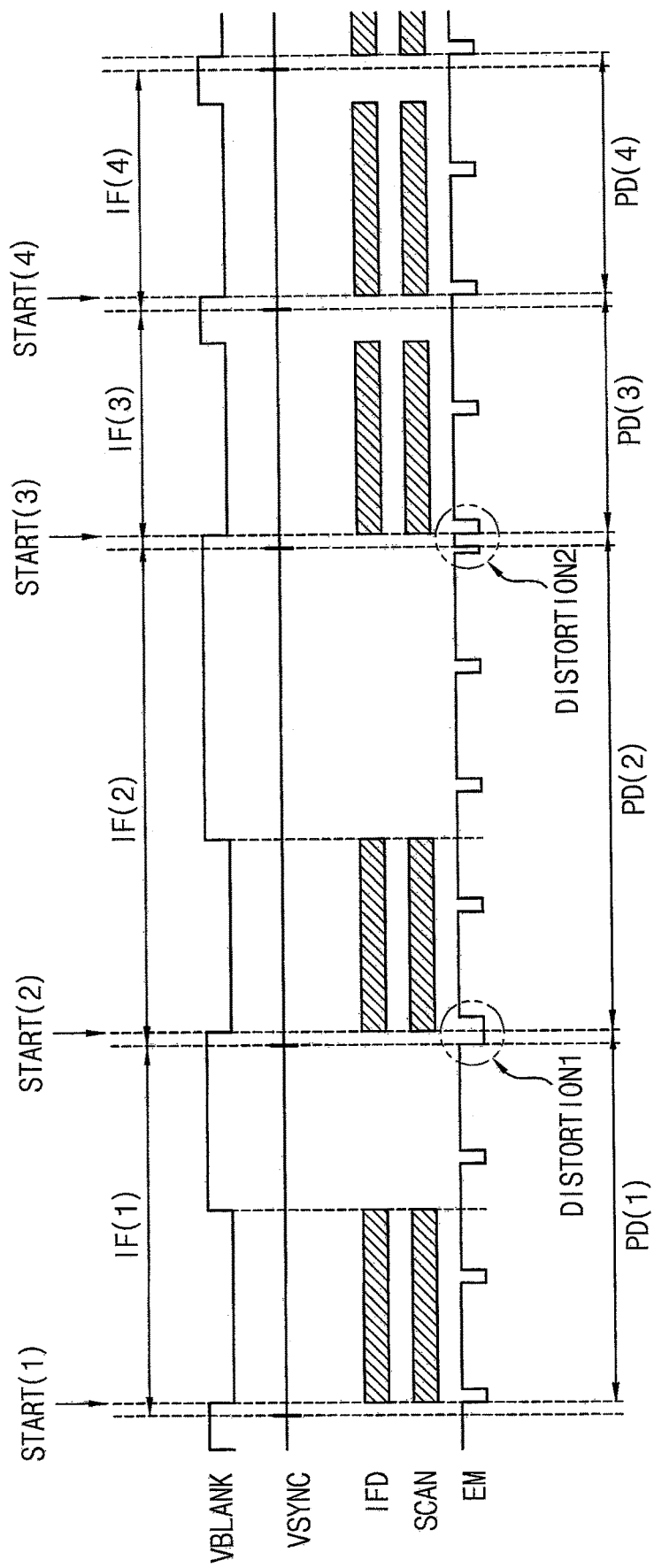
FIG. 4 is a timing diagram for describing that an emission on-off clock is distorted when a driving timing of a panel driving frame is synchronized with a driving timing of an image frame in a display system employing a related synchronization technique.
Figure 5:
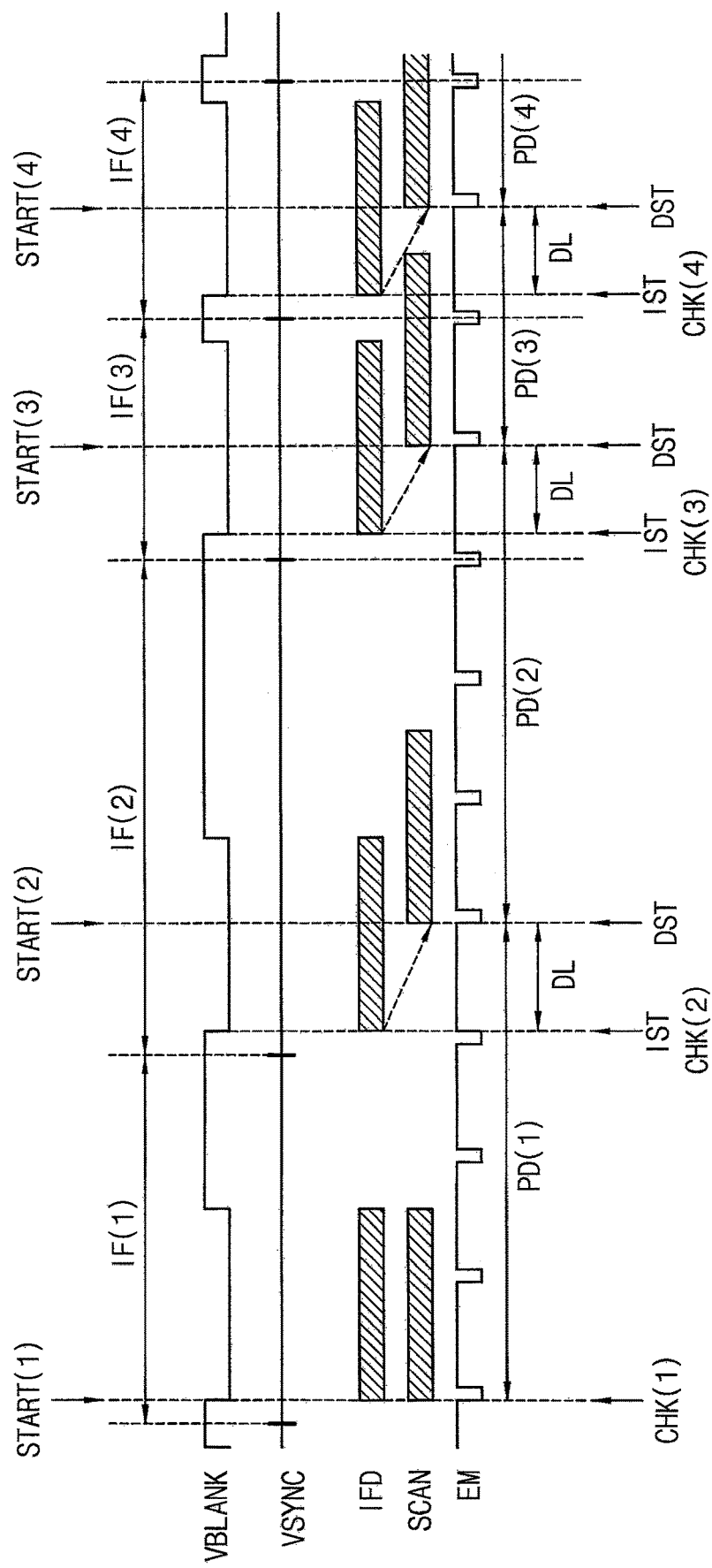
FIG. 5 is a timing diagram illustrating an example in which a sink device included in the display system of FIG. 1 synchronizes a driving timing of a panel driving frame with a driving timing of an image frame.
Figure 6:
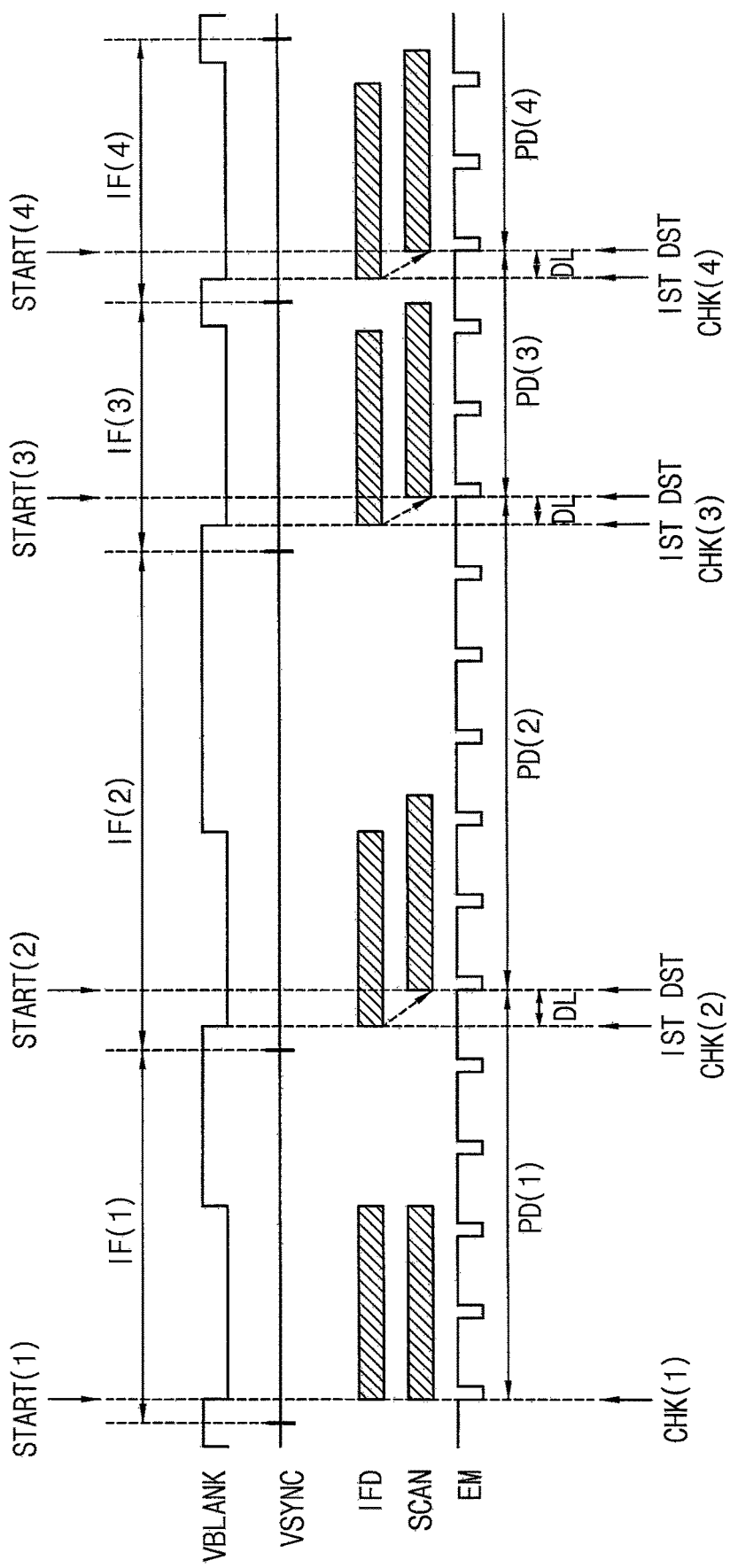
FIG. 6 is a timing diagram illustrating another example in which a sink device included in the display system of FIG. 1 synchronizes a driving timing of a panel driving frame with a driving timing of an image frame.
Figure 7:
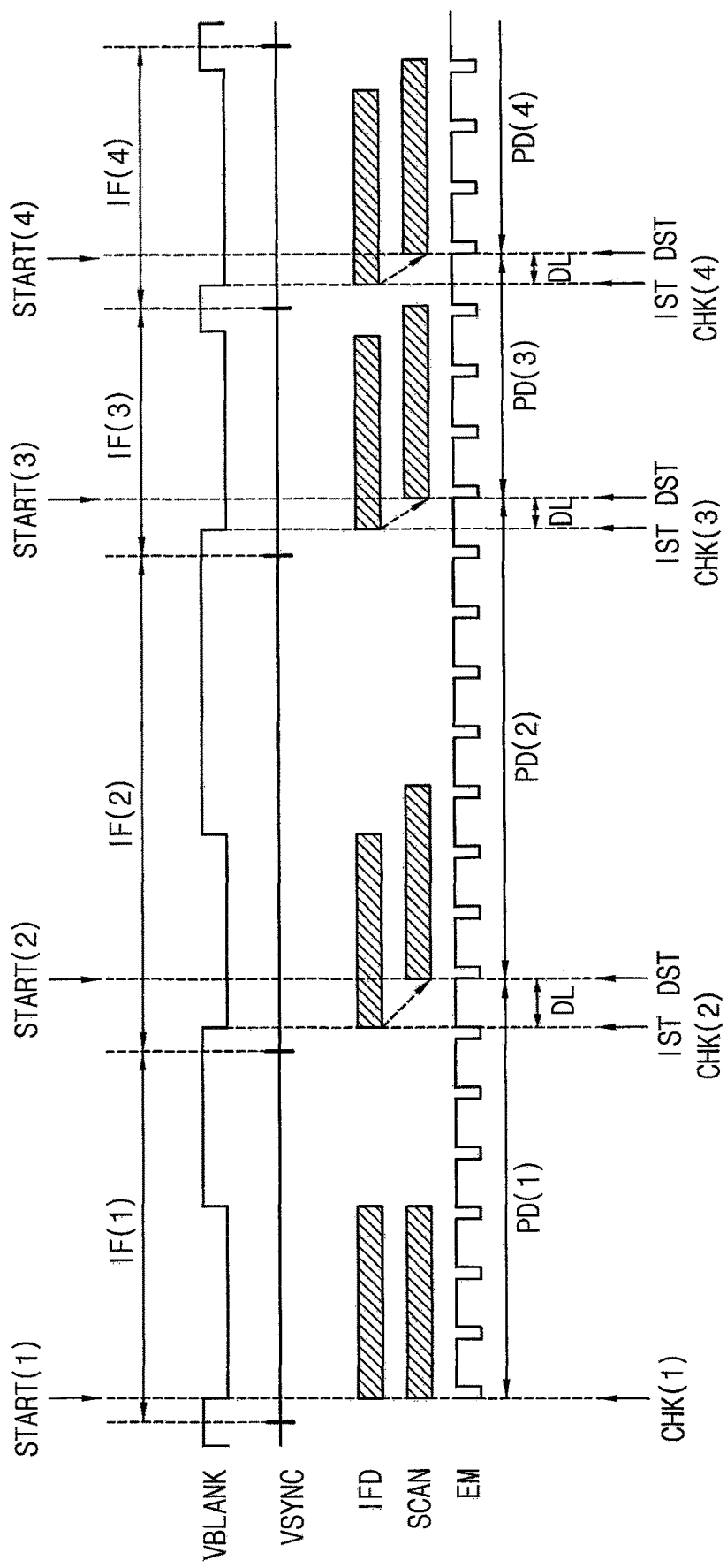
FIG. 7 is a timing diagram illustrating still another example in which a sink device included in the display system of FIG. 1 synchronizes a driving timing of a panel driving frame with a driving timing of an image frame.

FIG. 4 is a timing diagram for describing that an emission on-off clock is distorted when a driving timing of a panel driving frame is synchronized with a driving timing of an image frame in a display system employing a related synchronization technique, FIG. 5 is a timing diagram illustrating an example in which a sink device included in the display system of FIG. 1 synchronizes a driving timing of a panel driving frame with a driving timing of an image frame, FIG. 6 is a timing diagram illustrating another example in which a sink device included in the display system of FIG. 1 synchronizes a driving timing of a panel driving frame with a driving timing of an image frame, and FIG. 7 is a timing diagram illustrating still another example in which a sink device included in the display system of FIG. 1 synchronizes a driving timing of a panel driving frame with a driving timing of an image frame.

Referring to FIGS. 4 to 7, the sink device 140 may change the frame rate of the panel driving frame (e.g., PD(1), PD(2), PD(3), and PD(4)) as the source device 120 changes the frame rate of the image frame (e.g., IF(1), IF(2), IF(3), and IF(4)) composing the image data IMG-DAT while the displaying operation is performed. In embodiments, the image frame (e.g., IF(1), IF(2), IF(3), and IF(4)) may be defined by the vertical synchronization signal VSYNC. Here, a first period (e.g., a low period in FIGS. 4 to 7) of a vertical blank signal VBLANK may refer to a period in which the image frame data IFD is input. In addition, the frame rate (or the time) of the image frame (IF(1), IF(2), IF(3), and IF(4)) may be determined by adjusting a second period (e.g., a high period in FIGS. 4 to 7) of the vertical blank signal VBLANK.

For example, as illustrated in FIG. 4, when changing the frame rate of the panel driving frame (e.g., PD(1), PD(2), PD(3), and PD(4)) as the frame rate of the image frame (e.g., IF(1), IF(2), IF(3), and IF(4)) composing the image data IMG-DAT is changed, and when synchronizing the frame rate of the panel driving frame (e.g., PD(1), PD(2), PD(3), and PD(4)) with the frame rate of the image frame (e.g. IF(1), IF(2), IF(3), and IF(4)), a display system employing a related (or conventional) synchronization technique may control the scan starting point of the panel driving frame (e.g., PD(1), PD(2), PD(3), and PD(4)) to be consistent with the input starting point of the image frame data IFD corresponding to the image frame (e.g., IF(1), IF(2), IF(3), and IF(4)) without considering the emission on-off clock EM (e.g., the scan starting point being indicated by START(1), START(2), START(3), and START(4)).

Thus, because the off-period of the emission on-off clock EM may suitably start at the second starting point START(2), distortion may occur due to the off-period of the emission on-off clock EM being stretched at the second starting point START(2) (e.g., indicated by DISTORTION1). In addition, because the off-period of the emission on-off clock EM may suitably start at the third starting point START(3), distortion resulting from a period of the emission on-off clock EM being changed from the on-period to the off-period immediately at the third starting point START(3) may occur (e.g., indicated by DISTORTION2). As a result, when the frame rate of the panel driving frame (e.g., PD(1), PD(2), PD(3), and PD(4)) is changed as the frame rate of the image frame (e.g., IF(1), IF(2), IF(3), and IF(4)) is changed, the emission duty ratio of the panel driving frame (e.g., PD(1), PD(2), PD(3), and PD(4)) may be changed due to the distortion of the emission on-off clock EM. In addition, the emission duty ratio of each panel driving frame (e.g., PD(1), PD(2), PD(3), and PD(4)) may differ because a time of each panel driving frame might not become an integer multiple of a time corresponding to one clock cycle of the emission on-off clock EM. Thus, when the driving timing of the panel driving frame (e.g., PD(1), PD(2), PD(3), and PD(4)) is synchronized with the driving timing of the image frame (e.g., IF(1), IF(2), IF(3), and IF(4)), a flicker that a user can perceive may occur.

To overcome these problems, as illustrated in FIGS. 5 to 7, the sink device 140 of the display system 100 may set a first clock cycle starting point at which a first clock cycle of the emission on-off clock EM starts as the scan starting point of the panel driving frame (e.g., PD(1), PD(2), PD(3), and PD(4)) when the first clock cycle starting point is consistent with the input starting point IST of the image frame data IFD corresponding to the image frame (e.g., IF(1), IF(2), IF(3), and IF(4)).

In addition, the sink device 140 of the display system 100 may delay the input starting point IST of the image frame data IFD by a first time DL, which is shorter than a time corresponding to one clock cycle of the emission on-off clock EM, to move the input starting point IST of the image frame data IFD to a second clock cycle starting point at which a second clock cycle of the emission on-off clock EM following the first clock cycle starts (e.g., indicated by DST). The sink device 140 of the display system 100 may also set the second clock cycle starting point as the scan starting point of the panel driving frame (e.g., PD(1), PD(2), PD(3), and PD(4)) when the first clock cycle starting point is inconsistent with the input starting point IST of the image frame data IFD. Here, a clock cycle starting point at which one clock cycle of the emission on-off clock EM starts may be a falling edge at which a period of the emission on-off clock EM is changed from the on-period ON to the off-period OFF. As described above, an operation of delaying the input starting point IST of the image frame data IFD by the first time DL may be performed by the buffer memory device 148 having a sufficient capacity corresponding to the first time DL, where the buffer memory device 148 is included in the sink device 140. In other words, the buffer memory device 148 included in the sink device 140 may temporarily store a portion of the image frame data IFD corresponding to the first time DL, and then may output the portion of the image frame data IFD. With the exception that the number of times the pixel circuit 146 emits light in one panel driving frame (e.g., PD(1), PD(2), PD(3), and PD(4)) differs (e.g., the number of the on-periods ON of the emission on-off clock EM differs), a structure and an operation of the sink device 140 may be substantially identical in the embodiments corresponding to FIGS. 5 to 7. Thus, the structure and the operation of the sink device 140 will be described with reference to FIG. 5.

For example, when the image frame data IFD corresponding to the image frame IF(1) starts to be input at a first point CHK(1), the sink device 140 may check whether the input starting point IST of the image frame data IFD is consistent with the first clock cycle starting point at which the first clock cycle of the emission on-off clock EM (e.g., a clock cycle overlapping the input starting point IST of the image frame data IFD) starts. Here, because the input starting point IST of the image frame data IFD is consistent with the first clock cycle starting point at the first point CHK(1), the sink device 140 may set the first clock cycle starting point as the scan starting point of the panel driving frame PD(1). Thus, the sink device 140 may sequentially perform the scan operation on the horizontal lines of the display panel 144 from the first starting point START(1). In other words, the sink device 140 might not delay the input starting point IST of the image frame data IFD at the first point CHK(1).

Subsequently, when the image frame data IFD corresponding to the image frame IF(2) starts to be input at a second point CHK(2), the sink device 140 may check whether the input starting point IST of the image frame data IFD is consistent with the first clock cycle starting point at which the first clock cycle of the emission on-off clock EM starts (e.g., a clock cycle that the input starting point IST of the image frame data IFD overlaps). Here, because the input starting point IST of the image frame data IFD is inconsistent with the first clock cycle starting point at the second point CHK(2), the sink device 140 may delay the input starting point IST of the image frame data IFD by the first time DL (e.g., to a point indicated by DST), and may set the second clock cycle starting point at which the second clock cycle of the emission on-off clock EM starts (following the first clock cycle) as the scan starting point of the panel driving frame PD(2). Thus, the sink device 140 may sequentially perform the scan operation on the horizontal lines of the display panel 144 from the second starting point START(2).

Next, when the image frame data IFD corresponding to the image frame IF(3) starts to be input at a third point CHK(3), the sink device 140 may check whether the input starting point IST of the image frame data IFD is consistent with the first clock cycle starting point at which the first clock cycle of the emission on-off clock EM starts (e.g., a clock cycle that the input starting point IST of the image frame data IFD overlaps). Here, because the input starting point IST of the image frame data IFD is inconsistent with the first clock cycle starting point at the third point CHK(3), the sink device 140 may delay the input starting point IST of the image frame data IFD by the first time DL (e.g., indicated by DST), and may set the starting point of the second clock cycle as the scan starting point of the panel driving frame PD(3). Thus, the sink device 140 may sequentially perform the scan operation on the horizontal lines of the display panel 144 from the third starting point START(3).

Subsequently, when the image frame data IFD corresponding to the image frame IF(4) starts to be input at a fourth point CHK(4), the sink device 140 may check whether the input starting point IST of the image frame data IFD is consistent with the first clock cycle starting point at which the first clock cycle of the emission on-off clock EM starts (e.g., a clock cycle, which the input starting point IST of the image frame data IFD overlaps). Here, because the input starting point IST of the image frame data IFD is inconsistent with the first clock cycle starting point at the fourth point CHK(4), the sink device 140 may delay the input starting point IST of the image frame data IFD by the first time DL (e.g., may delay the input starting point to a point indicated by DST) and may set the second clock cycle starting point (at which the second clock cycle of the emission on-off clock EM following the first clock cycle starts) as the scan starting point of the panel driving frame PD(4). Thus, the sink device 140 may sequentially perform the scan operation on the horizontal lines of the display panel 144 from the fourth starting point START(4).

In brief, the sink device 140 of the display system 100 may set the first clock cycle starting point (at which the first clock cycle of the emission on-off clock EM starts) as the scan starting point of the panel driving frame when the first clock cycle starting point is consistent with the input starting point IST of the image frame data IFD corresponding to the image frame. In addition, the sink device 140 of the display system 100 may delay the input starting point IST of the image frame data IFD by the first time DL to move the input starting point IST of the image frame data IFD to the second clock cycle starting point DST at which the second clock cycle of the emission on-off clock EM following the first clock cycle starts, and may set the second clock cycle starting point as the scan starting point of the panel driving frame when the first clock cycle starting point is inconsistent with the input starting point IST of the image frame data IFD. Thus, the sink device 140 of the display system 100 may control a time, or duration, of the panel driving frame to be an integer multiple of a time, or duration, corresponding to one clock cycle of the emission on-off clock EM when the frame rate of the panel driving frame is changed as the frame rate of the image frame is changed. In other words, the sink device 140 of the display system 100 may change the frame rate of the panel driving frame while satisfying a condition in which the emission duty ratio of the panel driving frame is not changed. As a result, the frame rate of the panel driving frame may be changed while satisfying [Equation 1]:

$$F = \frac{1}{A \times K},$$

where F denotes the frame rate of the panel driving frame, A denotes a time corresponding to one clock cycle of the emission on-off clock EM, and K is an integer greater than or equal to 1.

For example, because the frame rate of the panel driving frame is inversely proportional to the time, or length of time, of the panel driving frame, according to the [Equation 1], the time of the panel driving frame may have a value generated by multiplying a time A corresponding to one clock cycle of the emission on-off clock EM by the integer K. In other words, because the sink device 140 of the display system 100 changes the frame rate of the panel driving frame to control the time of the panel driving frame to be an integer multiple of the time corresponding to one clock cycle of the emission on-off clock EM, the sink device 140 of the display system 100 may change the frame rate of the panel driving frame while satisfying the condition in which the emission duty ratio of the panel driving frame is not changed. Thus, the sink device 140 of the display system 100 may maintain the emission duty ratio of the panel driving frame constant, so that a perceivable flicker may be caused in the images that are displayed by the sink device 140 of the display system 100. As described above, when changing the frame rate of the panel driving frame as the frame rate of the image frame composing the image data IMG-DAT is changed, and when synchronizing the frame rate of the panel driving frame with the frame rate of the image frame, the sink device 140 of the display system 100 may not distort the emission on-off clock EM, and may maintain as constant the emission duty ratio of each panel driving frame synchronized with each image frame. As a result, the sink device 140 of the display system 100 may provide a high-quality image to a user.

Figure 8:
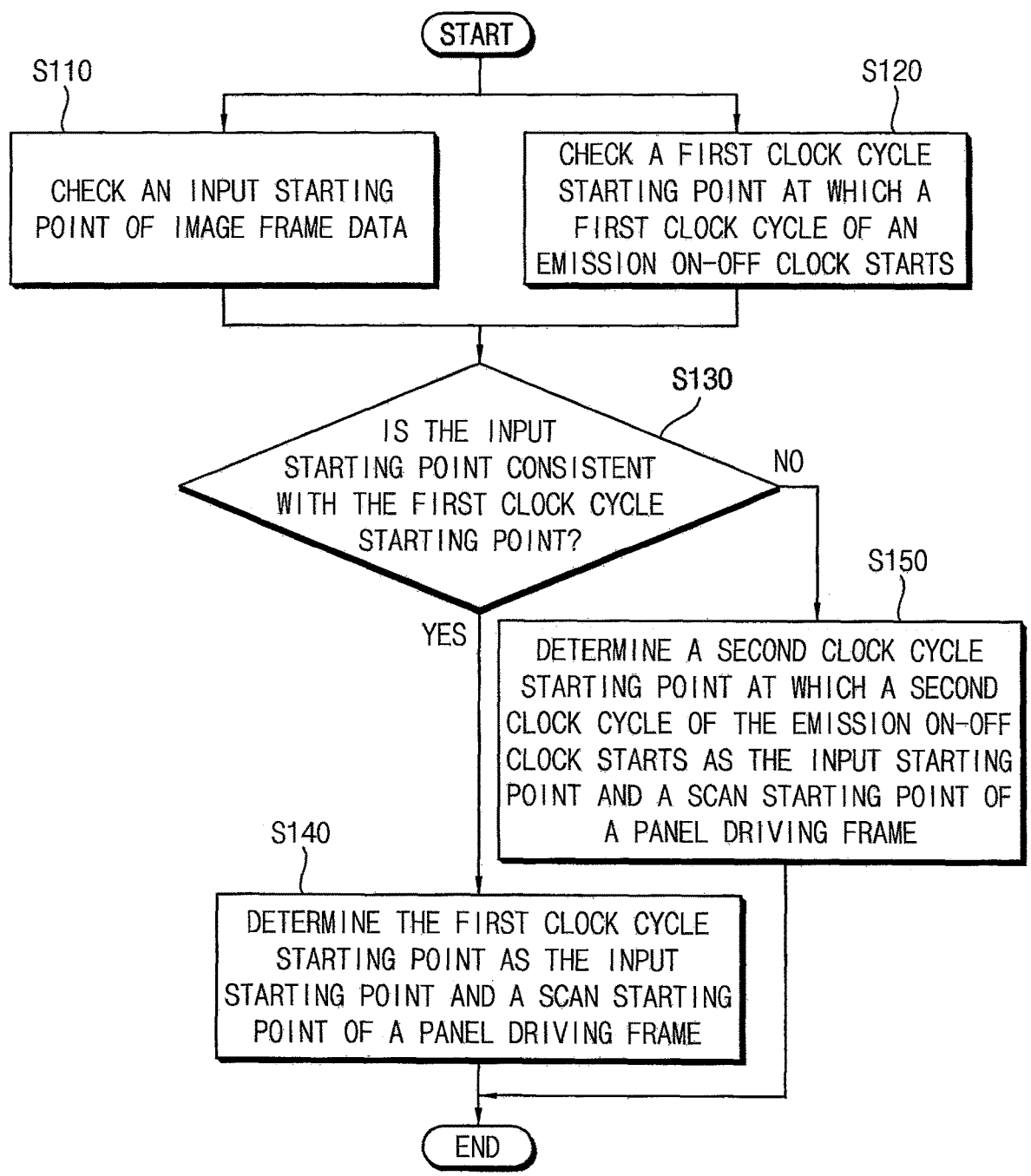
FIG. 8 is a flowchart diagram illustrating a method of synchronizing a frame driving timing according to embodiments.

FIG. 8 is a flowchart diagram illustrating a method of synchronizing a frame driving timing according to embodiments.

Referring to FIG. 8, the method of FIG. 8 may change a frame rate of a panel driving frame (or a time of the panel driving frame) as a frame rate of an image frame composing image data (or a time of the image frame) is changed while a displaying operation is performed.

For example, the method of FIG. 8 may check an input starting point of image frame data corresponding to the image frame (S110) and may check a first clock cycle starting point at which a first clock cycle of an emission on-off clock for controlling a light emitting element included in a pixel circuit to emit light (e.g., an emission on-off clock for a first horizontal line on which a scan operation is performed first among a plurality of horizontal lines) starts (S120). Here, the first clock cycle starting point at which the first clock cycle of the emission on-off clock starts may be a falling edge at which a period of the emission on-off clock is changed from an on-period to an off-period. As described above, the light emitting element included in the pixel circuit may emit light in the on-period of the emission on-off clock, the light emitting element included in the pixel circuit may not emit light in the off-period of the emission on-off clock, and the light emitting element included in the pixel circuit may emit light only a given number (e.g. a predetermined number) of times in each panel driving frame. Subsequently, the method of FIG. 8 may check whether the input starting point of the image frame data is consistent with the first clock cycle starting point at which the first clock cycle of the emission on-off clock starts (S130).

Here, when the input starting point of the image frame data is consistent with the first clock cycle starting point at which the first clock cycle of the emission on-off clock starts, the method of FIG. 8 may determine the first clock cycle starting point at which the first clock cycle of the emission on-off clock starts as the input starting point of the image frame data and a scan starting point of the panel driving frame (S140). Thus, the method of FIG. 8 may perform the scan operation (e.g., a data writing operation) on the pixel circuits connected to the first horizontal line at the first clock cycle starting point at which the first clock cycle of the emission on-off clock starts, and may control the pixel circuits to emit light (e.g., a predetermined number of times) in response to the emission on-off clock. In other words, the scan operation may be sequentially performed on the horizontal lines from the first clock cycle starting point at which the first clock cycle of the emission on-off clock starts.

On the other hand, when the input starting point of the image frame data is inconsistent with the first clock cycle starting point at which the first clock cycle of the emission on-off clock starts, the method of FIG. 8 may determine a second clock cycle starting point at which a second clock cycle of the emission on-off clock (following the first clock cycle) starts as the input starting point of the image frame data and the scan starting point of the panel driving frame (S150). Here, the second clock cycle starting point at which the second clock cycle of the emission on-off clock starts may be a falling edge at which a period of the emission on-off clock is changed from an on-period to an off-period. Thus, the method of FIG. 8 may perform the scan operation on the pixel circuits connected to the first horizontal line at the second clock cycle starting point at which the second clock cycle of the emission on-off clock starts, and may control the pixel circuits to emit light (e.g., a predetermined number of times) in response to the emission on-off clock. In other words, the scan operation may be sequentially performed on the horizontal lines from the second clock cycle starting point at which the second clock cycle of the emission on-off clock starts.

As described above, the method of FIG. 8 may not change the on-period and the off-period of the emission on-off clock when the frame rate of the panel driving frame and the frame rate of the image frame are changed. In addition, the method of FIG. 8 may select (or determine) only the falling edges at which a period of the emission on-off clock is changed from the on-period to the off-period as the input starting point of the image frame data and the scan starting point of the panel driving frame. Thus, the method of FIG. 8 may control the time of the panel driving frame to be an integer multiple of the time corresponding to one clock cycle of the emission on-off clock when the frame rate of the panel driving frame is changed as the frame rate of the image frame is changed. As a result, when synchronizing the frame rate of the panel driving frame with the frame rate of the image frame, the method of FIG. 8 may not distort the emission on-off clock, and may maintain the emission duty ratio of each panel driving frame synchronized with each image frame constant. That is, the method of FIG. 8 may change the frame rate of the panel driving frame while satisfying a condition in which the emission duty ratio of the panel driving frame is not changed. For example, the method of FIG. 8 may change the frame rate of the panel driving frame while satisfying the [Equation 1].

Figure 9:
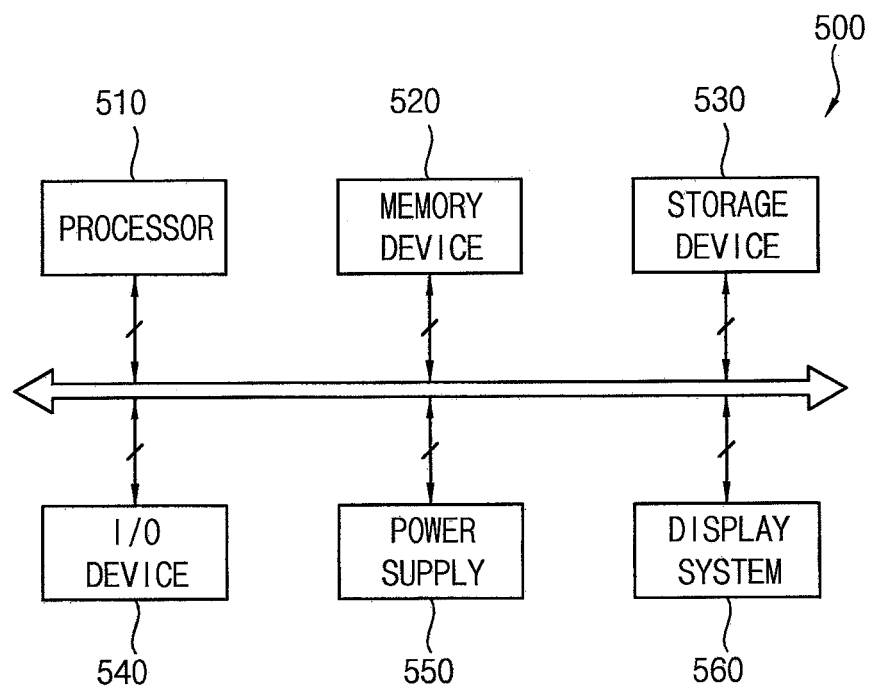
FIG. 9 is a block diagram illustrating an electronic device according to embodiments.
Figure 10:
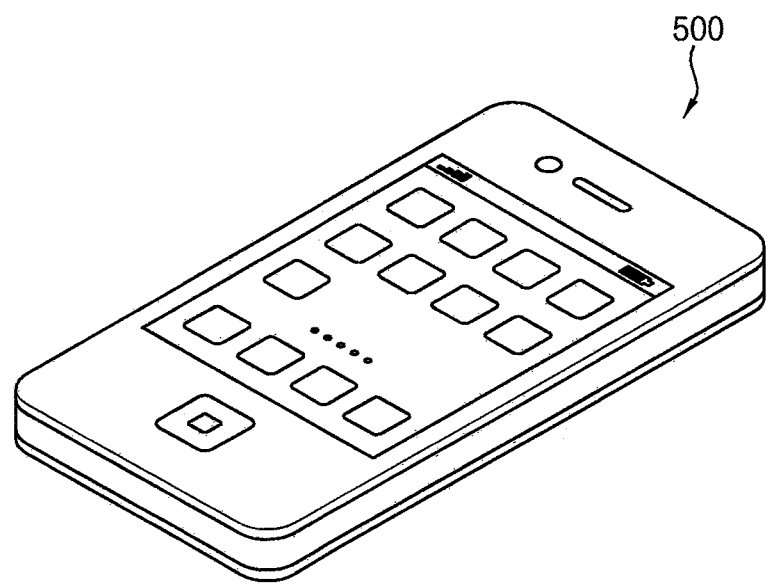
FIG. 10 is a diagram illustrating an example in which the electronic device of FIG. 9 is implemented as a smart phone.

FIG. 9 is a block diagram illustrating an electronic device according to embodiments, and FIG. 10 is a diagram illustrating an example in which the electronic device of FIG. 9 is implemented as a smart phone.

Referring to FIGS. 9 and 10, the electronic device 500 may include a processor 510, a memory device 520, a storage device 530, an input/output (I/O) device 540, a power supply 550, and a display system 560. Here, the display system 560 may be the display system 100 of FIG. 1. In addition, the electronic device 500 may further include a plurality of ports for communicating with a video card, a sound card, a memory card, a universal serial bus (USB) device, other electronic devices, etc. In an embodiment, as illustrated in FIG. 10, the electronic device 500 may be implemented as a smart phone. However, the electronic device 500 is not limited thereto. For example, the electronic device 500 may be implemented as a cellular phone, a video phone, a smart pad, a smart watch, a tablet PC, a car navigation system, a television, a computer monitor, a laptop, a head mounted display (HMD) device, etc.

The processor 510 may perform various computing functions. The processor 510 may be a microprocessor, a central processing unit (CPU), an application processor (AP), etc. The processor 510 may be coupled to other components via an address bus, a control bus, a data bus, etc. Further, the processor 510 may be coupled to an extended bus such as a peripheral component interconnection (PCI) bus. The memory device 520 may store data for operations of the electronic device 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 530 may include a solid state drive (SSD) device, a hard disk drive (HDD) device, a CD-ROM device, etc. The I/O device 540 may include an input device such as a keyboard, a keypad, a mouse device, a touchpad, a touch-screen, etc., and an output device such as a printer, a speaker, etc. In some embodiments, the display system 560 may be included in the I/O device 540. The power supply 550 may provide power for operations of the electronic device 500.

The display system 560 may be coupled to other components via the buses or other communication links. For example, the display system 560 may include a source device and a sink device that perform data communication using a given interface. The source device may provide image data to the sink device. In an embodiment, the source device may be a graphic processing unit. The sink device may receive the image data from the source device, and may perform a displaying operation based on the image data. In an embodiment, the sink device may be an organic light emitting display device. As described above, the display system 560 may employ an impulse driving method by which a light emitting element (e.g., an organic light emitting diode) included in a pixel circuit emits light in response to an emission on-off clock. In other words, the sink device may include the pixel circuit that includes the light emitting element which emits light in response to the emission on-off clock in a panel driving frame for the displaying operation. For example, the light emitting element may emit light in an on-period of the emission on-off clock, the light emitting element may not emit light in an off-period of the emission on-off clock, and the light emitting element may emit light (e.g., only a predetermined number of times) in each panel driving frame. The source device may change a frame rate of an image frame composing the image data (or a time of the image frame) in real-time while the displaying operation is performed. The sink device may change a frame rate of a panel driving frame (or a time of the panel driving frame) as the frame rate of the image frame is changed. Here, the sink device may set a first clock cycle starting point at which a first clock cycle of the emission on-off clock starts as a scan starting point of the panel driving frame when the first clock cycle starting point is consistent with an input starting point of image frame data corresponding to the image frame. In addition, the sink device may delay the input starting point of the image frame data by a specific time to move the input starting point of the image frame data to a second clock cycle starting point at which a second clock cycle of the emission on-off clock following the first clock cycle starts and may set the second clock cycle starting point as the scan starting point of the panel driving frame when the first clock cycle starting point is inconsistent with the input starting point of the image frame data. Thus, the display system 560 may synchronize a driving timing of the panel driving frame with a driving timing of the image frame without distortion of the emission on-off clock when the frame rate of the panel driving frame is changed as the frame rate of the image frame is changed. As a result, the display system 560 may prevent a flicker that a user can perceive from occurring by maintaining an emission duty ratio of each panel driving frame constant, so that the display system 560 may provide a high-quality image to the user. Because these operations are described above, duplicated description will not be repeated.

Embodiments of the present inventive concept may be applied to a display system and an electronic device including the display system. For example, the embodiments may be applied to a cellular phone, a smart phone, a video phone, a smart pad, a smart watch, a tablet PC, a car navigation system, a television, a computer monitor, a laptop, a digital camera, an HMD device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims, with functional equivalents thereof to be included therein. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display system comprising:
a source device configured to output image data; and
a sink device configured to perform a displaying operation based on the image data, the sink device comprising a pixel circuit that comprises a light emitting element for emitting light in response to an emission on-off clock in a panel driving frame for the displaying operation,
wherein the source device is configured to change a frame rate of an image frame composing the image data while the displaying operation is performed,
wherein the sink device is configured to:
change a frame rate of the panel driving frame as the frame rate of the image frame is changed, such that a first panel driving frame has a different frame rate than a second panel driving frame, wherein the first panel driving frame and the second panel driving frame have a same emission duty ratio for an entirety of the first and second panel driving frames;
set a first clock cycle starting point, at which a first clock cycle of the emission on-off clock starts, as a scan starting point of the panel driving frame when the first clock cycle starting point is consistent with an input starting point of image frame data corresponding to the image frame; and
delay the input starting point of the image frame data by a first time to move the input starting point of the image frame data to a second clock cycle starting point, at which a second clock cycle following the first clock cycle starts, and set the second clock cycle starting point as the scan starting point of the panel driving frame when the first clock cycle starting point is inconsistent with the input starting point of the image frame data.

2. The display system of claim 1, wherein the source device comprises a graphic processing unit, wherein the sink device comprises an organic light emitting display device, and wherein the light emitting element comprises an organic light emitting diode.

3. The display system of claim 1, wherein the light emitting element emits light in an on-period of the emission on-off clock, the light emitting element does not emit light in an off-period of the emission on-off clock, and the light emitting element emits light only a number of times in each panel driving frame.

4. The display system of claim 3, wherein the first clock cycle starting point and the second clock cycle starting point are falling edges at which the emission on-off clock is changed from the on-period to the off-period.

5. The display system of claim 4, wherein the on-period and the off-period of the emission on-off clock are not changed when the frame rate of the image frame and the frame rate of the panel driving frame are changed.

6. The display system of claim 1, wherein the sink device comprises a buffer memory device having more than a capacity corresponding to the first time, the buffer memory device being configured to temporarily store a portion of the image frame data corresponding to the first time, and to then output the portion of the image frame data.

7. The display system of claim 6, wherein the first time is shorter than a time corresponding to one clock cycle of the emission on-off clock.

8. The display system of claim 1, wherein the sink device is configured to increase the frame rate of the panel driving frame as the source device increases the frame rate of the image frame.

9. The display system of claim 8, wherein the sink device is configured to decrease the frame rate of the panel driving frame as the source device decreases the frame rate of the image frame.

10. The display system of claim 9, wherein the frame rate of the panel driving frame is changed while satisfying $$F = \frac{1}{A \times K},$$

where F denotes the frame rate of the panel driving frame, A denotes a time corresponding to one clock cycle of the emission on-off clock, and K is an integer that is greater than or equal to 1.

11. The display system of claim 1, wherein the source device is configured to change the frame rate of the image frame according to characteristics of images to be displayed by the displaying operation.

12. The display system of claim 11, wherein the source device is configured to increase the frame rate of the image frame when the images change faster than a reference speed.

13. The display system of claim 11, wherein the source device is configured to decrease the frame rate of the image frame when the images change slower than a reference speed.

14. A method of synchronizing a frame driving timing, wherein a frame rate of a panel driving frame is changed as a frame rate of an image frame composing image data is changed while a displaying operation is performed, such that a first panel driving frame has a different frame rate than a second panel driving frame, wherein the first panel driving frame and the second panel driving frame have a same emission duty ratio for an entirety of the first and second panel driving frames, the method comprising:
checking whether an input starting point of image frame data corresponding to the image frame is consistent with a first clock cycle starting point at which a first clock cycle of an emission on-off clock starts, wherein a light emitting element of a pixel circuit is configured to emit light in response to the emission on-off clock;
determining the first clock cycle starting point as the input starting point of the image frame data and a scan starting point of the panel driving frame when the input starting point of the image frame data is consistent with the first clock cycle starting point; and
determining a second clock cycle starting point, at which a second clock cycle following the first clock cycle starts, as the input starting point of the image frame data and the scan starting point of the panel driving frame when the input starting point of the image frame data is inconsistent with the first clock cycle starting point.

15. The method of claim 14, wherein the light emitting element is configured to emit light in an on-period of the emission on-off clock, wherein the light emitting element is not configured to emit light in an off-period of the emission on-off clock, and wherein the light emitting element is configured to emit light only a number of times in each panel driving frame.

16. The method of claim 15, wherein the first clock cycle starting point and the second clock cycle starting point are falling edges at which the emission on-off clock is changed from the on-period to the off-period.

17. The method of claim 16, wherein the on-period and the off-period of the emission on-off clock are not changed when the frame rate of the image frame and the frame rate of the panel driving frame are changed.

18. The method of claim 17, further comprising changing the frame rate of the panel driving frame while satisfying $$F = \frac{1}{A \times K},$$

where F denotes the frame rate of the panel driving frame, A denotes a time corresponding to one clock cycle of the emission on-off clock, and K is an integer that is greater than or equal to 1.

* * * * *